United States Patent
Eltaher et al.

(10) Patent No.: US 12,210,133 B2
(45) Date of Patent: Jan. 28, 2025

(54) DETERMINATION OF CONTINUOUS OIL DENSITY LOG FOR RESERVOIR CHARACTERIZATION

(71) Applicant: Saudi Arabian Oil Company, Dhahran (SA)

(72) Inventors: Yahia Ahmed Eltaher, Dhahran (SA); Shouxiang Mark Ma, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 52 days.

(21) Appl. No.: 17/903,649

(22) Filed: Sep. 6, 2022

(65) Prior Publication Data

US 2024/0077636 A1    Mar. 7, 2024

(51) Int. Cl.
  *G01V 5/10* (2006.01)
  *G01V 3/20* (2006.01)
  *G01V 11/00* (2006.01)

(52) U.S. Cl.
  CPC ............... *G01V 5/102* (2013.01); *G01V 3/20* (2013.01); *G01V 11/002* (2013.01)

(58) Field of Classification Search
  CPC ......... G01V 5/102; G01V 3/20; G01V 11/002
  See application file for complete search history.

(56) References Cited

U.S. PATENT DOCUMENTS

| 8,271,248 | B2 | 9/2012 | Pomerantz et al. |
| 8,996,346 | B2 | 3/2015 | Zuo et al. |
| 9,255,475 | B2 | 2/2016 | Zuo et al. |
| 9,410,936 | B2 | 8/2016 | Zuo et al. |
| 9,416,647 | B2 | 8/2016 | Zuo et al. |
| 9,416,656 | B2 | 8/2016 | Pomerantz |
| 9,442,217 | B2 | 9/2016 | Pomerantz et al. |
| 11,280,191 | B2 | 3/2022 | Zuo et al. |
| 11,906,692 | B2 * | 2/2024 | Zhang ................... G01V 5/102 |
| 2015/0094960 | A1 | 4/2015 | Kadayam Viswanathan et al. |
| 2017/0058666 | A1 | 3/2017 | Chen et al. |

(Continued)

FOREIGN PATENT DOCUMENTS

| CA | 2950730 A1 | 12/2015 |
| CN | 102706772 A | 10/2012 |
| CN | 202533343 U | 11/2012 |

OTHER PUBLICATIONS

Eltaher, Y. et al.; "Reservoir Surveillance Program Optimization Using Rapid Nuclear Modeling Integrated with Formation Testing and Sampling" SPE-187972-MS, SPE Annual Technical Symposium and Exhibition, Dammam, Saudi Arabia Apr. 24-17, 2017; pp. 1-14.

(Continued)

*Primary Examiner* — Elias Desta
(74) *Attorney, Agent, or Firm* — Bracewell LLP; Constance G. Rhebergen; Brian H. Tompkins

(57) ABSTRACT

A determination of a continuous oil density log for a hydrocarbon reservoir accessible via a well drilling into the formation having the reservoir. The logging operations may be conducted in the well to generate a carbon-oxygen ratio (C/O) log, a water saturation log, and a porosity log. A continuous oil density log may be determined using the C/O log, the water saturation log, the porosity log, and carbon and oxygen density values. The continuous oil density log may be used in further characterization and development of the hydrocarbon reservoir.

14 Claims, 4 Drawing Sheets
(1 of 4 Drawing Sheet(s) Filed in Color)

(56) References Cited

U.S. PATENT DOCUMENTS

| | | |
|---|---|---|
| 2019/0219558 A1 | 7/2019 | Villar De Andrade E Silva et al. |
| 2021/0072422 A1 | 3/2021 | Eltaher et al. |
| 2022/0252753 A1 | 8/2022 | Zhang et al. |
| 2024/0068365 A1* | 2/2024 | Al-Mustafa ............. E21B 49/10 |

OTHER PUBLICATIONS

New Jersey Department of Environmental Protection; "Evaluation of Extractable Petroleum Hydrocarbons in Soil Technical Guidance" Jun. 2019, Version 1.0; pp. 1-61.

\* cited by examiner

DETERMINATION OF CONTINUOUS OIL DENSITY LOG FOR RESERVOIR CHARACTERIZATION

BACKGROUND

Field of the Disclosure

The present disclosure generally relates to developing wells for the production of hydrocarbons from hydrocarbon-bearing reservoirs. More specifically, embodiments of the disclosure relate to determining a continuous oil density log for hydrocarbon wells.

Description of the Related Art

A hydrocarbon reservoir is a subsurface pool of hydrocarbons (e.g., oil or gas) trapped in a subsurface or subsea rock formation. Hydrocarbon wells are often drilled into hydrocarbon reservoirs to extract (or "produce") the trapped hydrocarbons. Understanding the characteristics of a hydrocarbon reservoir can be beneficial for making critical decisions regarding how to locate and produce wells and develop a reservoir. In particular, dynamic reservoir surveillance may be important for integrated reservoir management, especially for mature reservoirs.

Reservoirs may be characterized by obtaining and measuring static and dynamic properties using a variety of techniques. For example, certain properties may be determined by way of a logging operation. A logging operation typically includes lowering a logging tool into a wellbore of a well and recording measurements of in-situ conditions as the tool traverses the wellbore. This can be accomplished, for example, by way of a wireline logging, logging-while-drilling (LWD), or measurement-while-drilling (MWD). A plot of the measurements versus depth is referred to as a "well log" or "log." Logs can be assessed to determine in-situ characteristics of the well and the reservoir.

SUMMARY

Oil saturation of a reservoir is one characteristic used in reservoir development. Accurate oil saturation monitoring is needed for operational decision making and planning in such development. Moreover, increased accuracy of remaining and residual oil saturation is needed for specific operations, such as improving sweep efficiency of oil by waterflood. Reducing oil saturation uncertainties relies on obtaining accurate petrophysical parameters, such as oil density, which reflect static and dynamic properties of a reservoir. However, existing carbon-oxygen (C/O) techniques assume a constant oil density value which subsequently introduces error or uncertainty in oil saturation determinations.

Carbon/oxygen (C/O) logging may be used for reservoir saturation monitoring and may show a particular sensitivity to changes in oil properties due to changes in the carbon content of the molecular structure of oil. Embodiments of the disclosure generally relate to determining an accurate and representative in-situ continuous oil density log using carbon/oxygen (C/O) log with another saturation log, such as that derived from an openhole resistivity water saturation log or a pulsed neutron (PN) capture (sigma) water saturation log.

In one embodiment, a method of determining continuous oil density of a hydrocarbon reservoir accessed by a well extending into the hydrocarbon reservoir is provided. The method includes conducting a pulsed neutron (PN) logging operation in the well to generate a carbon/oxygen (C/O) log for the well and conducting a water saturation logging operation to generate a water saturation log for the well, such that the water saturation logging operation includes the PN logging operation, a resistivity logging operation, or a dielectric logging operation. The method also includes conducting a porosity logging operation to generate a porosity log for the well and obtaining a carbon density value and an oxygen density value, the carbon density and oxygen density each associated with reservoir rock or pore fluids of the hydrocarbon reservoir. The method further includes determining, based on the C/O log, the water saturation log, the porosity log, and the carbon density value and the oxygen density value, a continuous oil density log for the well.

In some embodiments, the plurality of carbon density value includes a carbon density of carbonates and the oxygen density value includes an oxygen density of rocks and an oxygen density of water. In some embodiments, determining, based on the C/O log, the water saturation log, and the plurality of carbon density values and a plurality of oxygen density values, a continuous oil density log for the well includes determining the continuous oil density log using the following:

$$\rho_o = \frac{2.16 \times \left( \frac{Y_c}{Y_0} (\phi S_w n_{o,w} + V_{ls} n_{o,ls}) - V_{ls} n_{c,ls} \right)}{10^{23} \phi S_o}$$

Where $\phi$ is porosity, $n_{o,w}$ is the oxygen density of water, $n_{o,ls}$ is the oxygen density of limestone, $n_{c,ls}$ is the carbon density of limestone, $V_{ls}$ is the volume fraction of limestone, $Y_c/Y_o$ is a measure of C/O ratio, $S_w$ is water saturation, $S_o$ is oil saturation where $S_w+S_o=1$, and $\rho_o$ is the density of oil. In some embodiments, the method includes developing the reservoir based on the continuous oil density log for the well. In some embodiments, developing the reservoir includes determining, based on the continuous oil density log for the well, well operating parameters and operating the well in accordance with the well operating parameters. In some embodiments, determining, based on the C/O log, the water saturation log, and the plurality of carbon density values and a plurality of oxygen density values, a continuous oil density log for the well includes determining the continuous oil density log using the following:

$$\frac{6.023 * 10^{23}}{(12+R)} \rho_o = \frac{\frac{Y_c}{Y_0} (\phi S_w n_{o,w} + V_{ls} n_{o,ls}) - V_{ls} n_{c,ls}}{\phi S_o}$$

Where R is the ratio of hydrogen (H) to carbon (C), $\phi$ is porosity, $n_{o,w}$ is the oxygen density of water, $n_{o,ls}$ is the oxygen density of limestone, $n_{c,ls}$ is the carbon density of limestone, $V_{ls}$ is the volume fraction of limestone, $Y_c/Y_o$ is a measure of C/O ratio, $S_w$ is water saturation, $S_o$ is oil saturation where $S_w+S_o=1$, and $\rho_o$ is the density of oil. In some embodiments, the method includes comparing the continuous oil density log to a viscosity log associated with the well.

In another embodiment, a non-transitory computer-readable storage medium having executable code stored thereon of determining continuous oil density of a hydrocarbon reservoir accessed by a well extending into the hydrocarbon reservoir is provided. The executable code includes a set of instructions that causes a processor to perform operations that include conducting a pulsed neutron (PN) logging operation in the well to generate a carbon/oxygen (C/O) log for the well and conducting a water saturation logging operation to generate a water saturation log for the well, such that the water saturation logging operation includes the PN logging operation, a resistivity logging operation, or a dielectric logging operation. The operations also include conducting a porosity logging operation to generate a porosity log for the well and obtaining a carbon density value and an oxygen density value associated with reservoir rock and pore fluids of the hydrocarbon reservoir. The operations further include determining, based on the C/O log, the water saturation log, the porosity log, and the carbon density value and the oxygen density value, a continuous oil density log for the well.

In some embodiments, the plurality of carbon density value includes a carbon density of carbonates and the oxygen density value includes an oxygen density of rocks and an oxygen density of water. In some embodiments, determining, based on the C/O log, the water saturation log, and the plurality of carbon density values and a plurality of oxygen density values, a continuous oil density log for the well includes determining the continuous oil density log using the following:

$$\rho_o = \frac{2.16 \times \left(\frac{Y_c}{Y_0}(\phi S_w n_{o,w} + V_{ls} n_{o,ls}) - V_{ls} n_{c,ls}\right)}{10^{23} \phi S_o}$$

Where $\phi$ is porosity, $n_{o,w}$ is the oxygen density of water, $n_{o,ls}$ is the oxygen density of limestone, $n_{c,ls}$ is the carbon density of limestone, $V_{ls}$ is the volume fraction of limestone, $Y_c/Y_o$ is a measure of C/O ratio, $S_w$ is water saturation, $S_o$ is oil saturation where $S_w+S_o=1$, and $\rho_o$ is the density of oil. In some embodiments, the operations include developing the reservoir based on the continuous oil density log for the well. In some embodiments, developing the reservoir includes determining, based on the continuous oil density log for the well, well operating parameters and operating the well in accordance with the well operating parameters. In some embodiments, determining, based on the C/O log, the water saturation log, and the plurality of carbon density values and a plurality of oxygen density values, a continuous oil density log for the well includes determining the continuous oil density log using the following:

$$\frac{6.023 * 10^{23}}{(12+R)} \rho_o = \frac{\frac{Y_c}{Y_0}(\phi S_w n_{o,w} + V_{ls} n_{o,ls}) - V_{ls} n_{c,ls}}{\phi S_o}$$

Where R is the ratio of hydrogen (H) to carbon (C), $\phi$ is porosity, $n_{o,w}$ is the oxygen density of water, $n_{o,ls}$ is the oxygen density of limestone, $n_{c,ls}$ is the carbon density of limestone, $V_{ls}$ is the volume fraction of limestone, $Y_c/Y_o$ is a measure of C/O ratio, $S_w$ is water saturation, $S_o$ is oil saturation where $S_w+S_o=1$, and $\rho_o$ is the density of oil. In some embodiments, the operations include comparing the continuous oil density log to a viscosity log associated with the well.

In another embodiment, a system of determining continuous oil density of a hydrocarbon reservoir accessed by a well extending into the hydrocarbon reservoir is provided. The system includes a processor and a non-transitory computer-readable memory accessible by the processor and having executable code stored thereon. The executable code includes a set of instructions that causes a processor to perform operations that include conducting a pulsed neutron (PN) logging operation in the well to generate a carbon/oxygen (C/O) log for the well and conducting a water saturation logging operation to generate a water saturation log for the well, such that the water saturation logging operation includes the PN logging operation, a resistivity logging operation, or a dielectric logging operation. The operations also include conducting a porosity logging operation to generate a porosity log for the well and obtaining a carbon density value and an oxygen density value, the carbon density and oxygen density each associated with reservoir rock or pore fluids of the hydrocarbon reservoir. The operations further include determining, based on the C/O log, the water saturation log, the porosity log, and the carbon density value and the oxygen density value, a continuous oil density log for the well.

In some embodiments, the plurality of carbon density value includes a carbon density of carbonates and the oxygen density value includes an oxygen density of rocks and an oxygen density of water. In some embodiments, determining, based on the C/O log, the water saturation log, and the plurality of carbon density values and a plurality of oxygen density values, a continuous oil density log for the well includes determining the continuous oil density log using the following:

$$\rho_o = \frac{2.16 \times \left(\frac{Y_c}{Y_0}(\phi S_w n_{o,w} + V_{ls} n_{o,ls}) - V_{ls} n_{c,ls}\right)}{10^{23} \phi S_o}$$

Where $\phi$ is porosity, $n_{o,w}$ is the oxygen density of water, $n_{o,ls}$ is the oxygen density of limestone, $n_{c,ls}$ is the carbon density of limestone, $V_{ls}$ is the volume fraction of limestone, $Y_c/Y_o$ is a measure of C/O ratio, $S_w$ is water saturation, $S_o$ is oil saturation where $S_w+S_o=1$, and $\rho_o$ is the density of oil. In some embodiments, the operations include developing the reservoir based on the continuous oil density log for the well. In some embodiments, developing the reservoir includes determining, based on the continuous oil density log for the well, well operating parameters and operating the well in accordance with the well operating parameters. In some embodiments, determining, based on the C/O log, the water saturation log, and the plurality of carbon density values and a plurality of oxygen density values, a continuous oil density log for the well includes determining the continuous oil density log using the following:

$$\frac{6.023 * 10^{23}}{(12+R)} \rho_o = \frac{\frac{Y_c}{Y_0}(\phi S_w n_{o,w} + V_{ls} n_{o,ls}) - V_{ls} n_{c,ls}}{\phi S_o}$$

Where R, is the ratio of hydrogen (H) to carbon (C), $\phi$ is porosity, $n_{o,w}$ is the oxygen density of water, $n_{o,ls}$ is the oxygen density of limestone, $n_{c,ls}$ is the carbon density of limestone, $V_{ls}$ is the volume fraction of limestone, $Y_c/Y_o$ is a measure of C/O ratio, $S_w$ is water saturation, $S_o$ is oil saturation where $S_w+S_o=1$, and $\rho_o$ is the density of oil. In some embodiments, the operations include comparing the continuous oil density log to a viscosity log associated with the well.

BRIEF DESCRIPTION OF THE DRAWINGS

The patent or application file contains at least one drawing executed in color. Copies of this patent or patent application

DETAILED DESCRIPTION

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

Embodiments of the disclosure are directed to a determination of a continuous oil density log for a hydrocarbon reservoir accessible via well drilling into the formation bearing the reservoir. Various logging operations may be conducted in the well to generate different logs that characterize the reservoir. The logging operations may generate a carbon-oxygen ratio (C/O) log, a water saturation log, and a porosity log. A continuous oil density log may be determined using the C/O log, the water saturation log, the porosity log, and carbon and oxygen density values of the rock matrix and pore fluids. The continuous oil density log may be used in further characterization and development of the hydrocarbon reservoir, such as well completion, reservoir development (for example, drilling additional wells or extending existing wells), and production optimization.

Figure 1:
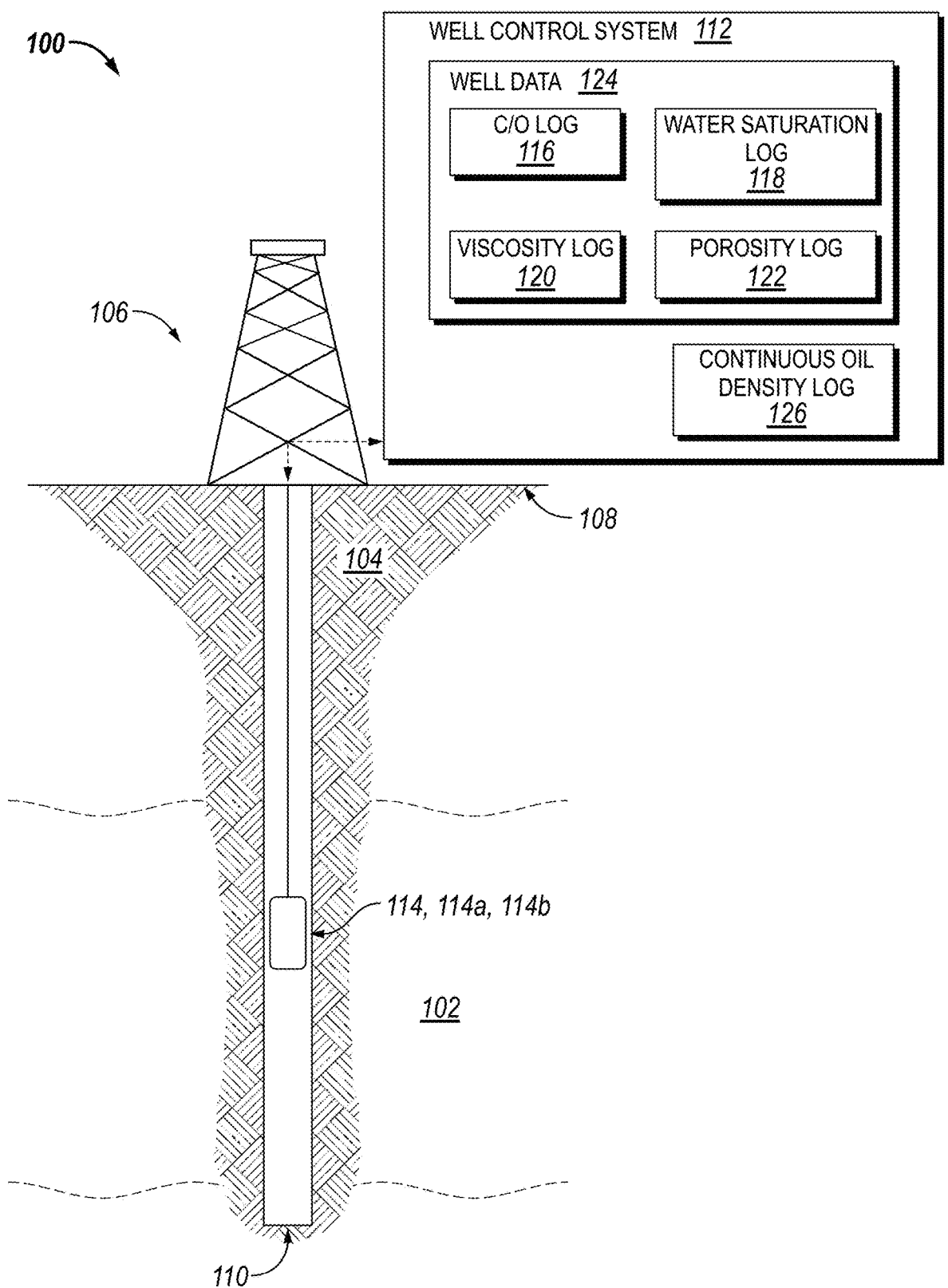
FIG. 1 is a diagram that illustrates a well environment in accordance with an embodiment of the disclosure.

FIG. 1 is a diagram that illustrates a well environment 100 in accordance with one or more embodiments. In the illustrated embodiment, the well environment 100 includes a reservoir ("reservoir") 102 located in a subsurface formation ("formation") 104, and a well system ("well") 106.

The formation 104 may include a porous or fractured rock formation that resides underground, beneath the Earth's surface ("surface") 108. The reservoir 102 may be a hydrocarbon reservoir, and the well 106 may be a hydrocarbon well, such as an oil well. In the case of the well 106 being a hydrocarbon well, the reservoir 102 may be a hydrocarbon reservoir defined by a portion of the formation 104 that contains (or that is determined to contain or expected to contain) a subsurface pool of hydrocarbons, such as oil and gas, coexist with formation connate water. The formation 104 and the reservoir 102 may each include different layers of rock having varying characteristics, such as varying degrees of lithology, permeability, porosity, and fluid saturations. In the case of the well 106 being operated as a production well, the well 106 may facilitate the extraction of hydrocarbons (or "production") from the reservoir 102. In the case of the well 106 being operated as an injection well, the well 106 may facilitate the injection of substances, such as gas or water, into the reservoir 102. In the case of the well 106 being operated as a monitoring well, the well 106 may facilitate the monitoring of various characteristics of the formation 104 or the reservoir 102.

The well 106 may include a wellbore 110 and a well control system ("control system") 112. The control system 112 may control various operations of the well 106, such as well drilling operations, well completion operations, well production operations, or well and formation monitoring operations. In some embodiments, the control system 112 includes a computer system that is the same as or similar to that of the computer system 400 described with regard to FIG. 4.

The wellbore 110 (or "borehole") may include a bored hole that extends from the surface 108 into a target zone of the formation 104, such as the reservoir 102. An upper end of the wellbore 110, at or near the surface 108, may be referred to as the "up-hole" end of the wellbore 110. A lower end of the wellbore 110, terminating in the formation 104, may be referred to as the "downhole" end of the wellbore 110. The wellbore 110 may be created, for example, by a drill bit boring through the formation 104 and the reservoir 102. The wellbore 110 may provide for the circulation of drilling fluids during drilling operations, the flow of hydrocarbons (e.g., oil and gas) from the reservoir 102 to the surface 108 during production operations, the injection of substances (e.g., water) into the formation 104 or the reservoir 102 during injection operations, or the communication of monitoring devices (e.g., logging tools) into the formation 104 or the reservoir 102 during monitoring operations (e.g., during shut-in or flow well logging operations). In some embodiments, the wellbore 110 includes cased ("cased hole") or uncased (or "openhole") portions. A cased portion may include a portion of the wellbore 110 lined with casing (e.g., the up-hole end of the wellbore 110 may be lined with casing pipe which is cemented with the formation). An uncased portion may include a portion of the wellbore 110 that is not lined with casing (e.g., the openhole, down-hole end of the wellbore 110).

In some embodiments, well logging operations are conducted to measure and obtain characteristics of the portions of the formation 104 surrounding the wellbore 110. During a well logging operation, a logging tool 114 (e.g., including a measurement device) may be lowered into the wellbore 110 and be operated to measure characteristics of the formation 104 surrounding the wellbore 110 as it is moved along a length (or "interval") of the wellbore 110. The characteristics of the formation 104 may include physical properties of the formation 104 surrounding the wellbore 110. The depth of measurement (or "investigation") into the formation 104 (e.g., the distance from the walls of the wellbore 110 into the formation 104 for which measurements are acquired) may vary based on the type and parameters of the logging operation. In some instances, the measurements are recorded in a corresponding well log that provides a mapping of the measurements (or values determined therefrom) versus depth in the wellbore 110. In some embodiments, the well logging operations for the well 106 are controlled by the control system 112 or another operator of the well 106.

In some embodiments, a pulsed neutron (PN) logging operation is conducted to generate a C/O log 116 that indicates C/O characteristics of the formation 104, such as carbon-to-oxygen yield ratio ($Y_c/Y_o$), as a function of depth in the wellbore 110. Pulsed neutron (PN) logging operations typically measure gamma rays generated by absorption of neutrons produced by a neutron source in the surrounding reservoir. A PN C/O logging operation may employ gamma ray spectroscopy measurements to directly sense the presence of carbon atoms in oil and oxygen atoms associated with water. In some instances, C/O logs are derived using gamma ray inelastic spectrometry, for example, based on measurements acquired using a PN logging tool.

The PN logging of the well 106 may include moving a PN logging tool 114a along a length of the wellbore 110 to obtain C/O logging data that is used to generate a corresponding C/O log 116 for the well 106. The C/O log 116 may include mapping of carbon-to-oxygen yield ratio ($Y_c/Y_o$) versus depth across a length (or "interval") of the wellbore 110. The C/O log 116 may be continuous in that it provides a continuous record of values of carbon-to-oxygen yield ratio ($Y_c/Y_o$) across the length of the wellbore 110.

In some embodiments, a water saturation log 118 may also be determined. In some embodiments, the water saturation log 118 is determined using a PN logging operation, by using a "sigma" log from the PN logging data. The sigma log reflects the effectiveness of a formation for capturing thermal neutrons; a higher sigma value indicates greater water saturation and a lower sigma value indicates less water saturation. In some embodiments, water saturation may be determined using the relationship between water saturation ($S_w$), porosity ($\phi$) of the formation rock, and sigma log values. The water saturation log may be continuous in that it provides a continuous record of water saturation across the length of the wellbore 110.

In other embodiments, the water saturation log 118 may be determined by an openhole resistivity, a cased hole resistivity, or dielectric constant logging operation that provides measurements used to determine the water saturation log. The resistivity logging of the well 106 may include moving a resistivity logging tool 114b along a length of an openhole or cased hole portion of the wellbore 110 to obtain resistivity logging data that is used to generate a corresponding resistivity log for the well 106. Resistivity logging measures the electrical resistivity of rock or sediment in and around a borehole. As such, resistivity indicates how strongly the formation (rock and fluids) opposes the flow of electrical current, and can be indicative of the porosity of the formation and the presence of hydrocarbons. For example, resistivity may be relatively low for a formation that has high porosity and a large amount of water, and resistivity may be relatively high for a formation that has low porosity or contains a large amount of hydrocarbons. In some embodiments, water saturation may be determined using the relationship between in-situ electrical resistivity (R) of a porous rock to its porosity ($\phi$) and water saturation ($S_w$) known as Archie's law. In other embodiments, water saturation may be determined from resistivity using additional or alternative techniques. Dielectric constant logging may measure the dielectric permittivity of formation-contained water to determine the water saturation.

In some embodiments, other logging operations, such as nuclear magnetic resonance (NMR) logging, may be performed. The NMR logging tool may generate a magnetic field and pulsed radio frequency (RF) energy, and may collect corresponding NMR data that includes measurements of the resulting induced magnet moment of hydrogen nuclei (protons) contained within the fluid-filled pore space of porous media (e.g., rocks of the formation 104) surrounding the wellbore 110. In some embodiments, the NMR logging data may be used to generate viscosity data (e.g., including estimates varying values of viscosity ($\mu$) across along a length (or "interval") of the wellbore 110) and a corresponding viscosity log 120 that includes a mapping of viscosity ($\mu$) versus depth across the length of the wellbore 110. The viscosity log 120 may be continuous in that it provides a continuous record of values of viscosity ($\mu$) across the length of the wellbore 110.

A porosity log 122 may also be generated. In some embodiments, the porosity log 118 may be generated from NMR logging. In other embodiments, the porosity log 118 may be generated using other techniques and tools, such as bulk density logging, compensated neutron-porosity (CNL) logging, or the combination of density and neutron-porosity logging. The porosity log may be continuous in that it provides a continuous record of values of porosity across the depth of the wellbore 110.

In some embodiments, the control system 112 stores, or otherwise has access to, well data 124. The well data 124 may include data that is indicative of various characteristics of the well 106. The well data 124 may include, for example, logs for the well 106 (e.g., the C/O log 116, the viscosity log 120, or other logs) or other information regarding characteristics of the rock and fluids of the formation 104, such as determined or estimated properties of the formation 104 or the reservoir 102. In some embodiments, the control system 112 determines a continuous oil density log 126 for the well 106 based on the C/O log 116, the water saturation log 118, and the porosity log 122 for the well 106.

In some embodiments, determination of a continuous oil density log for the well 106 includes the following: (1) conducting logging operations to obtain C/O, water saturation and porosity log data, including: (a) conducting a PN logging operation to obtain the C/O log 138 (which, for example, defines values of carbon and oxygen yields $Y_c/Y_o$ of the formation 104 as a function of depth within the wellbore 120), (b) conducting a resistivity logging operation or a PN logging operation to obtain the water saturation log 118 (which defines values of water saturation as a function of depth within the wellbore 120); and (c) conducting a porosity logging operation to obtain the porosity log 142 (which defines values of porosity) of the formation 104 as a function of depth within the wellbore 120); (2) obtaining carbon and oxygen density values for the reservoir rocks and fluids in the formation; and (3) determining, based on the C/O log 138, the water saturation log, and the porosity log, the continuous oil density log 126 that defines in-situ values of oil density ($\rho_o$) as a function of depth within the wellbore 120 as discussed infra.

The fundamental physical relationship used in C/O logging is based on a mass balance of atomic carbon and oxygen from various sources in the formation. For a formation saturated with oil (o) and water (w) without a borehole, the following Equation can be determined:

$$\frac{Y_c}{Y_o} = \frac{V_o n_{c,o} + V_{ls} n_{c,ls}}{V_w n_{o,w} + V_{ls} n_{o,ls} + V_{ss} n_{o,ss}} = \frac{\phi S_o n_{c,o} + V_{ls} n_{c,ls}}{\phi S_w n_{o,w} + V_{ls} n_{o,ls} + V_{ss} n_{o,ss}} \quad (1)$$

Where:
$Y_c$ and $Y_o$ are total carbon and oxygen elemental yields, respectively. $Y_c/Y_o$ may be a measured C/O ratio (e.g., a ratio of carbon and oxygen (C/O) elemental yields for the given depth), which is regularly acquired, repeatedly, periodically, after the well was drilled to monitor the performance of the reservoir penetrated by the well;

$n_{c,o}$ is the atomic carbon density in oil (or oil carbon density or "OCD"), which may be constant or variable from depth to depth for the reservoir or well;

$n_{c,ls}$ is the atomic carbon density in limestone (representing carbonate rock matrix), which may be constant for the reservoir or well;

$n_{o,w}$, $n_{o,ls}$ and $n_{o,ss}$ are oxygen densities of water, limestone (representing carbonate rocks), and sandstone, respectively, which may be constants for the reservoir or well;

$V_{ls}$ and $V_{ss}$ are volume fractions of limestone (representing carbonate rocks) and sandstone, respectively, which may be measured values determined by way of an openhole logging or cased hole PN logging operations (e.g., measured values for given depth defined in well data 124 for the well 106 based on loggings of the well 106);

$V_o$ and $V_w$, are volume fractions of oil and water, respectively;

$S_o$ and $S_w$ are saturations of oil and water, respectively (e.g., determined values of oil and water saturation for the given depth), where $S_o + S_w = 1$; and $\phi$ is the fractional porosity, which is typically a measured value determined by way of an openhole logging operation soon after the well is drilled (e.g., a value of porosity for a given depth determined from logs of bulk density, neutron porosity, or NMR based on loggings of the well 106).

Oil saturation $S_o$, which is $1-S_w$, may be inverted from Equation 1 to derive the following:

$$S_o = f\left(\frac{Y_c}{Y_o}, \phi, V_{ls}, V_{ss}, n_{o,w}, n_{o,ls}, n_{o,ss}, n_{c,ls}, n_{c,o}\right) \quad (2)$$

In Equation 2, for a reservoir interval with porosity and lithology volumes $V_{ls}$ and $V_{ss}$, the following rock and fluid properties can be considered constants; $n_{c,ls}$, $n_{o,ls}$, and $n_{o,ss}$. Additionally, although the oxygen density of water $n_{o,w}$ may slightly change with water salinity, the salinity effect is minimal; thus, in some embodiments, $n_{o,w}$ may be assumed to be a constant. Carbon and oxygen atomic number density per volume values commonly found in reservoir rocks and fluids are summarized below in Table 1:

TABLE 1

CARBON AND OXYGEN DENSITY VALUES IN RESERVOIR ROCKS AND FLUIDS

| | | |
|---|---|---|
| $n_{c,o}$ | carbon density in oil | $(5.02 \times 10^{22})\rho_o/(1 + R/12)$ |
| $n_{c,ls}$ | carbon density in limestone | $1.62 \times 10^{22}$ |
| $n_{o,w}$ | oxygen density in fresh water | $3.33 \times 10^{22}$ |
| $n_{o,ss}$ | oxygen density in sandstone | $5.30 \times 10^{22}$ |
| $n_{o,ls}$ | oxygen density in limestone | $4.86 \times 10^{22}$ |
| $n_{ca,ls}$ | calcium density in limestone | $1.63 \times 10^{22}$ |
| $n_{si,ss}$ | silicon density in sandstone | $2.66 \times 10^{22}$ |

Where R is the ratio of hydrogen to carbon (H/C) and $\rho_o$ is the oil density.

As mentioned supra, most of the properties in Table 1 may be assumed to be invariant. However, the carbon density in oil may vary due to the compressibility of oil and its structural variability caused by reservoir fluid geodynamics. OCD may be expressed as a function of oil density ($\rho_o$) and the ratio of hydrogen to carbon (R), as shown in Equation 3:

$$n_{c,o} = 6.023 \times 10^{23} \frac{\rho_o}{12 + R} \quad (3)$$

The hydrogen to carbon ratio (R) in oil may vary independently from oil density and may affect the carbon density by volume of the oil $n_{c,o}$; as such, the variation in R may not have a significant impact on the saturation calculation as compared to oil density.

Equations 2 and 3 may be solved to derive the continuation oil density ($\rho_o$) log across a carbonate reservoir by using the water saturation ($S_w$) determined from another measurement such as openhole resistivity log or PN log, as follows:

$$n_{c,o} = \frac{\frac{Y_c}{Y_0}(\phi S_w n_{o,w} + V_{ls} n_{o,ls}) - V_{ls} n_{c,ls}}{\phi S_o} \quad (4)$$

$$\frac{6.023 * 10^{23}}{(12 + R)} \rho_o = \frac{\frac{Y_c}{Y_0}(\phi S_w n_{o,w} + V_{ls} n_{o,ls}) - V_{ls} n_{c,ls}}{\phi S_o} \quad (5)$$

$$\rho_o = \frac{12 + R}{6.023 * 10^{23}} \frac{\frac{Y_c}{Y_0}(\phi S_w n_{o,w} + V_{ls} n_{o,ls}) - V_{ls} n_{c,ls}}{\phi S_o} \quad (6)$$

Equation 6 was tested across a reservoir known for its vertical variation in oil properties. For best fit results, a number of iterations were performed with Equation 6 to derive the following, assuming R=1:

$$\rho_o = \frac{2.16 \times \left(\frac{Y_c}{Y_0}(\phi S_w n_{o,w} + V_{ls} n_{o,ls}) - V_{ls} n_{c,ls}\right)}{10^{23} \phi S_o} \quad (7)$$

Figure 2:
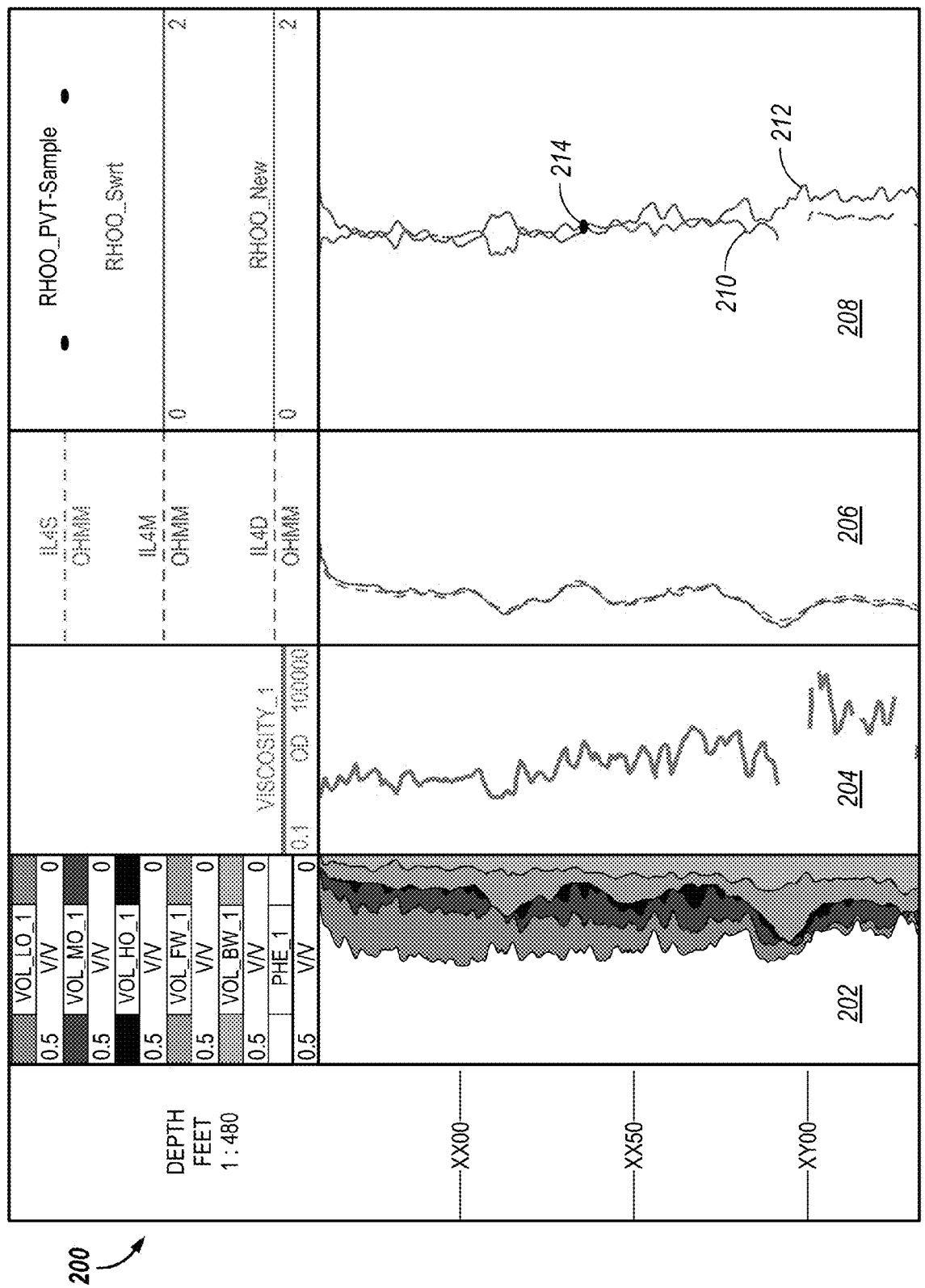
FIG. 2 is a composite log that includes a continuous oil density log in accordance with an embodiment of the disclosure.

Equation 7 was used across an example reservoir to determine a continuous oil density log. FIG. 2 depicts a composite log 200 that includes the example continuous oil density log determined from the example reservoir in accordance with an embodiment of the present disclosure. FIG. 2 includes the following logs: Fluid volumetrics based upon openhole triple combo logs of bulk density, neutron porosity, and resistivity, integrated with NMR data (track 202), where the black color represents a heavy oil component and the light green color represents a light oil component; NMR-based viscosity log (track 204); resistivity log (track 206); and oil density log (track 208).

The oil density log (track 208) of FIG. 2 includes an NMR-based empirical oil density log 210 in red and an oil density log 212 in blue that was determined according to the techniques of the present disclosure. The oil density log (track 208) also depicts the available PVT sample point 214 at a depth of 9735 feet. As shown in this track, the oil density log 212 derived from the techniques of the disclosure as an input exhibits a significant match to the NMR-based empirical oil density log 210 across the lighter oil fraction zones of the reservoir, yet exhibits superior and more accurate results across the heavier and more viscous oil fraction zones (track 204) towards the bottom of the reservoir, representing a significantly better correlation with the NMR-based viscosity log (track 204).

Figure 3:
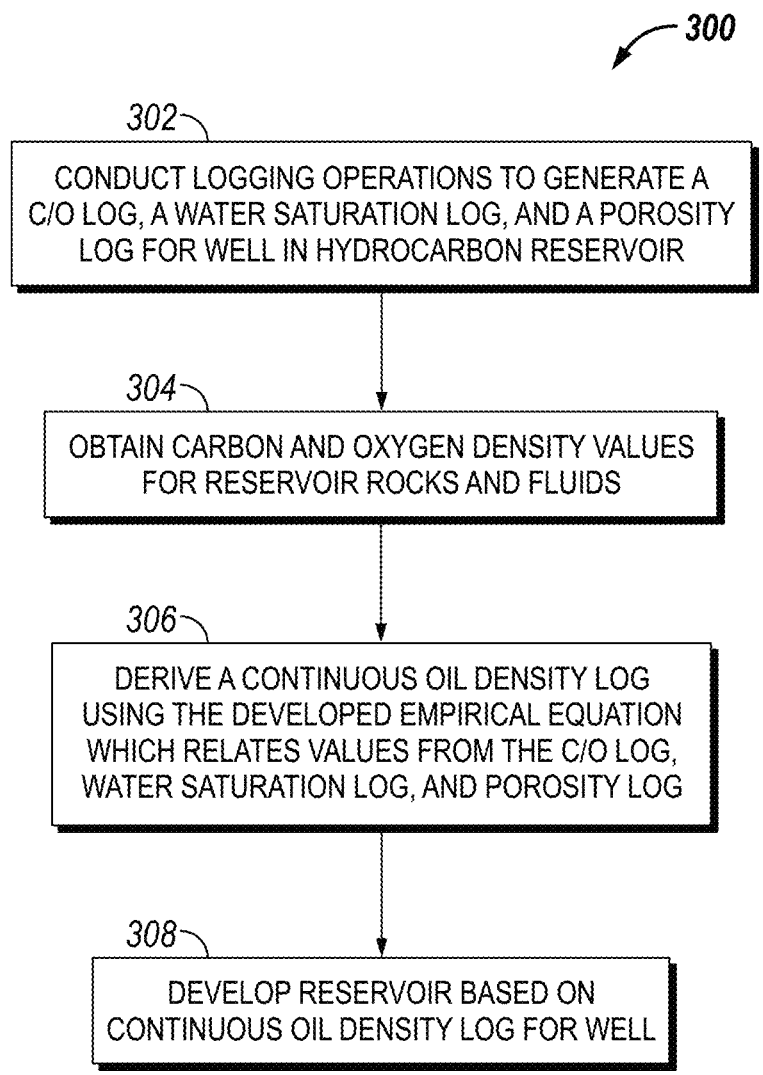
FIG. 3 is a flowchart of a process for determining a continuous oil density log in accordance with an embodiment of the disclosure.

FIG. 3 is a flowchart that illustrates a process 300 for determining a continuous oil density log and developing a hydrocarbon reservoir based on the continuous oil density log in accordance with an embodiment of the disclosure. In the context of the well 106, the operations of the process 300 may be performed, for example, by the well control system 112 or another operator of the well 106. A processing module of the well control system 112 may perform one or more of the data processing operations described, such as those directed to determining the continuous oil density log 126 for the well 106. A well operator, such as a control module of the well control system 112 or well personnel, may operate the well 106 (or other wells in the formation 104) based on the characteristics of the formation 104, including those identified in the continuous oil density log 126. For example, an operator may operate the well 106 (or other wells in the reservoir 102), or otherwise develop the reservoir 102, based on the values of oil density ($\rho_o$) of the continuous oil density log 126.

As shown in FIG. 3, the process 300 includes conducting logging operations to generate a C/O log, a water saturation log, and a porosity log for a well in a hydrocarbon reservoir (block 302). This may include, for example, conducting PN logging of the well 106 to generate the C/O log for a depth interval of the well, a porosity logging of the well 106 to generate the porosity log for the depth interval of the well 106, and conducting resistivity logging or PN logging of the well 106 to generate the water saturation log for the depth interval of the well 106.

The process 300 further includes obtaining carbon and oxygen density values for the reservoir rock and fluids (block 304). As discussed supra, certain carbon and oxygen density values may be assumed to constant and may use the values described in Table 1.

Next, a continuous oil density log for a well may be determined using C/O log, water saturation log, and other parameters (block 306), as described in Equation 7. For example, the continuous oil density log may include a record of the determined values of oil density ($\rho_o$) for the depths. For example, the oil density ($\rho_o$) for each of the depths of 1000 m, 1001 m, 1002 m and so forth in a wellbore may be determined.

As also shown in FIG. 3, the process 300 may include developing a reservoir based on the continuous oil density log for the well (block 308). For example, this may include developing the reservoir based on the determined oil density ($\rho_o$) values as various identified depths in the formation. In some embodiments, developing a reservoir includes undertaking operations, such as drilling a well, controlling well drilling operations, plugging back a well, re-perforating a well, controlling well production rates and pressure (i.e., production optimization), controlling well injection rates, injection fluid type, injection pressures, and so forth. For example, operating parameters for a well, such as injection rates or pressures (or production rates or pressures), may be determined based on the oil density ($\rho_o$) values of the determined continuous oil density log, and the well may be controlled to operate according to the parameters. For example, the well may be operated to inject fluid into the reservoir at certain injection rates, depths, or pressures, or the well may be operated to produce hydrocarbons from the reservoir 102 at certain productions rates or pressures. In some embodiments, the continuous oil density log may be provided as an input to petrophysical, geological, and reservoir simulation models to capture the changes in oil properties and enable the generation of more accurate results.

Advantageously, embodiments of the disclosure provide improved accuracy and precision of an oil density log, while providing a potentially deeper depth of investigation into a formation as compared to NMR and PN log measurements and avoiding the uncertainty inherent in NMR logging-based empirical oil density determinations. In contrast to NMR logging, the continuous oil density log determined by the embodiments of the disclosure is more representative of the true formation fluid properties due to the nature of the variables used in the determination and is not affected by the near wellbore logging environment.

Figure 4:
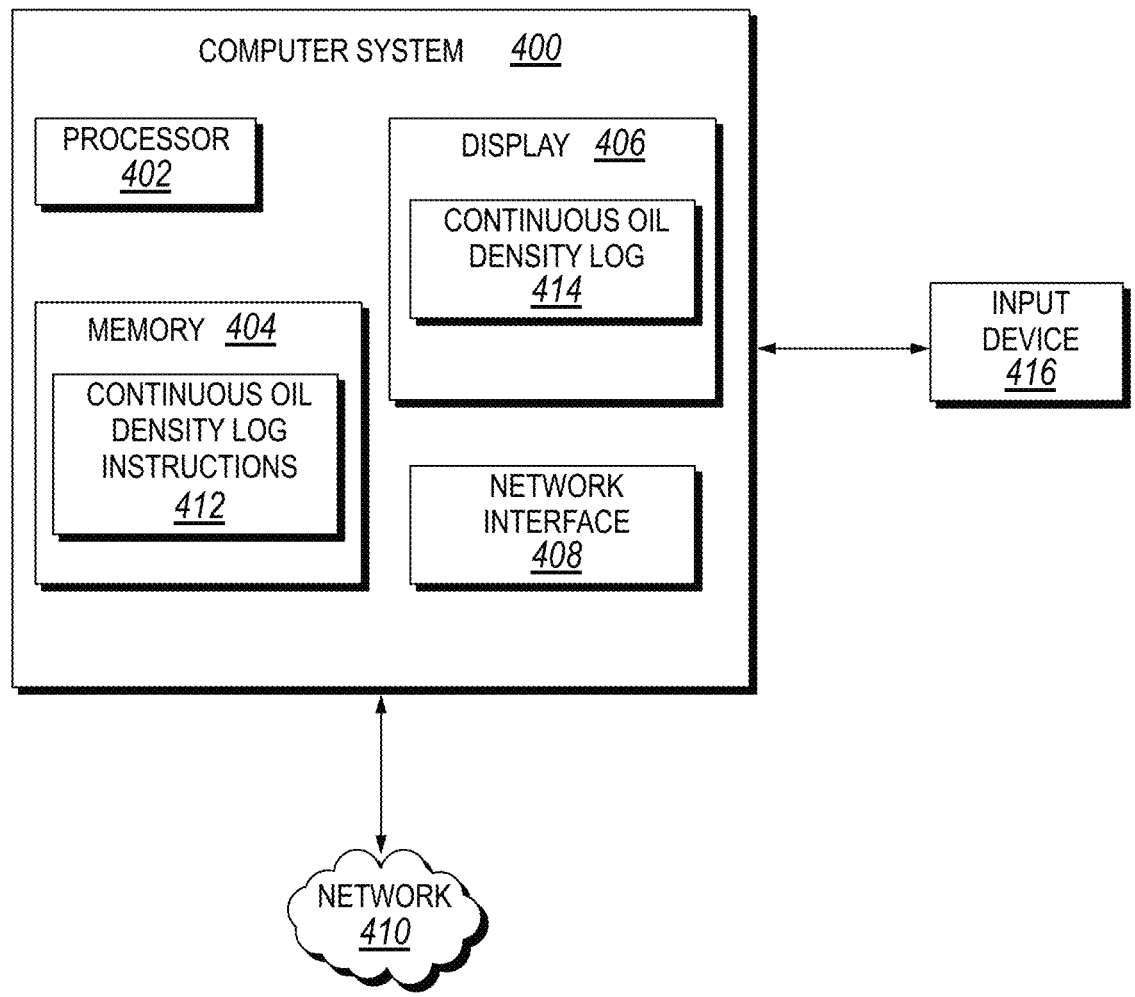
FIG. 4 is a block diagram of components of an example computer system in accordance with an embodiment of the disclosure.

FIG. 4 depicts components of an example computer system 400 in accordance with an embodiment of the disclosure. The example computer system 400 may represent a part of or be included with the well control system 100 discussed supra. In some embodiments, the example computer system 400 may be in communication with other components of a system for obtaining measurements from a well accessing a hydrocarbon-bearing reservoir. Such other components may include, for example, logging-while-drilling (LWD) systems, measurement-while-drilling (MWD) systems, and other systems that acquire information about hydrocarbon resources. As will be appreciated, such systems may use downhole tools, downhole sensors, drilling components, and other components for acquiring information about subsurface hydrocarbon resources.

As shown in FIG. 4, the example computer system 400 may include a processor 402, a memory 404, a display 406, and a network interface 408 that may be in communication with a network 410. It should be appreciated that the example computer system 400 may include other components that are omitted for clarity. In some embodiments, example computer system 400 may include or be a part of a computer cluster, cloud-computing system, a data center, a server rack or other server enclosure, a server, a virtual server, a desktop computer, a laptop computer, a tablet computer, or the like. In some embodiments, the example computer system 400 is not a part or does not have access to additional computing resources of a computer cluster, cloud computing system, etc., and may be used on-site at a remote wellsite for example.

The processor 402 (as used the disclosure, the term "processor" encompasses microprocessors) may include one or more processors having the capability to receive and process hydrocarbon resources data, such as the data described in the disclosure. In some embodiments, the processor 402 may include an application-specific integrated circuit (ASIC). In some embodiments, the processor 402 may include a reduced instruction set (RISC) processor. Additionally, the processor 402 may include a single-core processors and multicore processors and may include graphics processors. Multiple processors may be employed to provide for parallel or sequential execution of one or more of the techniques described in the disclosure. The processor 402 may receive instructions and data from a memory (for example, memory 404).

The memory 404 (which may include one or more tangible non-transitory computer readable storage mediums) may include volatile memory, such as random access memory (RAM), and non-volatile memory, such as ROM, flash memory, a hard drive, any other suitable optical, magnetic, or solid-state storage medium, or a combination thereof. The memory 404 may be accessible by the processor 402. The memory 404 may store executable computer code. The executable computer code may include computer program instructions for implementing one or more techniques described in the disclosure. For example, the executable computer code may include continuous oil density log instructions 412 to implement embodiments of the present disclosure. In some embodiments, the continuous oil density log instructions 412 may implement one or more elements of process 300 described above and illustrated in FIG. 3.

In some embodiments, the continuous oil density log instructions 412 may receive, as input, data from various sources. Such sources may be or include logs from logging operations, such as C/O logs and water saturation logs. In some embodiments, example computer system 400 may access the data via the network 410. In some embodiments, the data may be manually input to the example computer system 400.

As described herein, the continuous oil density log instructions 412 may produce, as output a continuous oil density log 414. The log 414 may be stored in the memory 404 and, as shown in FIG. 4, may be displayed on the display 406, such as in a graphical user interface.

The display 406 may include a cathode ray tube (CRT) display, liquid crystal display (LCD), an organic light emitting diode (OLED) display, or other suitable display. The display 406 may display a user interface (for example, a graphical user interface) that may display information received from the example computer system 400. In accordance with some embodiments, the display 406 may be a touch screen and may include or be provided with touch sensitive elements through which a user may interact with the user interface. In some embodiments, the display 406 may display the log 414 in accordance with the techniques described herein.

The network interface 408 may provide for communication between the example computer system 400 and other devices and systems via the network 410. The network interface 408 may include a wired network interface card (NIC), a wireless (e.g., radio frequency) network interface card, or combination thereof. The network interface 408 may include circuitry for receiving and sending signals to and from communications networks, such as an antenna system, an RF transceiver, an amplifier, a tuner, an oscillator, a digital signal processor, and so forth. The network interface 408 may communicate with networks, such as the Internet, an intranet, a wide area network (WAN), a local area network (LAN), a metropolitan area network (MAN) or other networks. Communication over networks may use suitable standards, protocols, and technologies, such as Ethernet Bluetooth, Wireless Fidelity (Wi-Fi) (e.g., IEEE 802.11 standards), and other standards, protocols, and technologies. In some embodiments, for example, the log 414 may be provided to other devices over the network 410 via the network interface 408.

In some embodiments, example computer system 400 may include or be coupled to an input device 416 (for example, one or more input devices). The input devices 416 may include, for example, a 416, a mouse, a microphone, or other input devices. In some embodiments, the input device 416 may enable interaction with a user interface (for example, a graphical user interface) displayed on the display 406.

The following examples are included to demonstrate embodiments of the disclosure. It should be appreciated by those of skill in the art that the techniques and compositions disclosed in the example which follows represents techniques and compositions discovered to function well in the practice of the disclosure, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the disclosure.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A method of determining continuous oil density log of a hydrocarbon reservoir accessed by a well extending into the hydrocarbon reservoir, the method comprising:

conducting a pulsed neutron (PN) logging operation in the well to generate a carbon/oxygen (C/O) log for the well;

conducting a water saturation logging operation to generate a water saturation log for the well, wherein the water saturation logging operation comprises the PN logging operation, a resistivity logging operation, or a dielectric logging operation;

conducting a porosity logging operation to generate a porosity log for the well;

obtaining a carbon density value and an oxygen density value, the carbon density and oxygen density each associated with reservoir rock or pore fluids of the hydrocarbon reservoir; and determining, based on the C/O log, the water saturation log, the porosity log, and the carbon density value and the oxygen density value, a continuous oil density log for the well;

developing the hydrocarbon reservoir based on the continuous oil density log for the well, the developing comprising:

determining, based on the continuous oil density log for the well, well operating parameters comprising an injection rate; and operating the well in accordance with the well operating parameters, the operating comprising injecting a fluid into the reservoir at the injection rate.

2. The method of claim 1, wherein the plurality of carbon density value comprises a carbon density of carbonates and the oxygen density value comprises an oxygen density of rocks and an oxygen density of water.

3. The method of claim 1, wherein determining, based on the C/O log, the water saturation log, and the plurality of carbon density values and a plurality of oxygen density values, a continuous oil density log for the well comprises determining the continuous oil density log using the following:

$$\rho_o = \frac{2.16 \times \left(\frac{Y_c}{Y_0}(\phi S_w n_{o,w} + V_{ls} n_{0,ls}) - V_{ls} n_{c,ls}\right)}{10^{23} \phi S_o}$$

where $\phi$ is porosity, $n_{o,w}$ is the oxygen density of water, $n_{o,ls}$ is the oxygen density of limestone, $n_{c,ls}$ is the carbon density of limestone, $V_{ls}$ is the volume fraction of limestone, $Y_c/Y_o$ is a measure of C/O ratio, $S_w$ is water saturation, $S_o$ is oil saturation where $S_o+S_w=1$, and $\rho_o$ is the density of oil.

4. The method of claim 1, wherein determining, based on the C/O log, the water saturation log, and the plurality of carbon density values and a plurality of oxygen density values, a continuous oil density log for the well comprises determining the continuous oil density log using the following:

$$\rho_o = \frac{12+R}{6.023*10^{23}} \frac{\frac{Y_c}{Y_0}(\phi S_w n_{o,w} + V_{ls}n_{o,ls}) - V_{ls}n_{c,ls}}{\phi S_o}$$

where R, is the ratio of hydrogen (H) to carbon (C), $\phi$ is porosity, $n_{o,w}$ is the oxygen density of water, $n_{o,ls}$ is the oxygen density of limestone, $n_{c,ls}$ is the carbon density of limestone, $V_{ls}$ is the volume fraction of limestone, $Y_c/Y_o$ is a measure of C/O ratio, $S_w$ is water saturation, $S_o$ is oil saturation where $S_o+S_w=1$, and $\rho_o$ is the density of oil.

5. The method of claim 1, comprising comparing the continuous oil density log to a viscosity log associated with the well.

6. A non-transitory computer-readable storage medium having executable code stored thereon of determining continuous oil density of a hydrocarbon reservoir accessed by a well extending into the hydrocarbon reservoir, the executable code comprising a set of instructions that causes a processor to perform operations comprising:
   conducting a pulsed neutron (PN) logging operation in the well to generate a carbon/oxygen (C/O) log for the well;
   conducting a water saturation logging operation to generate a water saturation log for the well, wherein the water saturation logging operation comprises the PN logging operation, a resistivity logging operation, a dielectric logging operation;
   conducting a porosity logging operation to generate a porosity log for the well;
   obtaining a carbon density value and an oxygen density value, the carbon density and oxygen density each associated with reservoir rock or pore fluids of the hydrocarbon reservoir; and
   determining, based on the C/O log, the water saturation log, the porosity log, and the carbon density value and the oxygen density value, a continuous oil density log for the well;
   developing the hydrocarbon reservoir based on the continuous oil density log for the well, the developing comprising:
      determining, based on the continuous oil density log for the well, well operating parameters comprising an injection rate; and
      operating the well in accordance with the well operating parameters, the operating comprising injecting a fluid into the reservoir at the injection rate.

7. The non-transitory computer-readable storage medium of claim 6, wherein the carbon density value comprises a carbon density of limestone and the oxygen density value comprises an oxygen density of limestone and an oxygen density of water.

8. The non-transitory computer-readable storage medium of claim 6, wherein determining, based on the C/O log, the water saturation log, and the plurality of carbon density values and a plurality of oxygen density values, a continuous oil density log for the well comprises determining the continuous oil density log using the following:

$$\rho_o = \frac{2.16 \times \left(\frac{Y_c}{Y_0}(\phi S_w n_{o,w} + V_{ls}n_{o,ls}) - V_{ls}n_{c,ls}\right)}{10^{23}\phi S_o}$$

where $\phi$ is porosity, $n_{o,w}$ is the oxygen density of water, $n_{o,ls}$ is the oxygen density of limestone, $n_{c,ls}$ is the carbon density of limestone, $V_{ls}$ is the volume fraction of limestone, C/O is a measures C/O ratio, $S_w$ is water saturation, $S_o$ is oil saturation where $S_o+S_w=1$, and $\rho_o$ is the density of oil.

9. The non-transitory computer-readable storage medium of claim 6, wherein determining, based on the C/O log, the water saturation log, and the plurality of carbon density values and a plurality of oxygen density values, a continuous oil density log for the well comprises determining the continuous oil density log using the following:

$$\rho_o = \frac{12+R}{6.023*10^{23}} \frac{\frac{Y_c}{Y_0}(\phi S_w n_{o,w} + V_{ls}n_{o,ls}) - V_{ls}n_{c,ls}}{\phi S_o}$$

where R is the ratio of hydrogen (H) to carbon (C), $\phi$ is porosity, $n_{o,w}$ is the oxygen density of water, $n_{o,ls}$ is the oxygen density of limestone, $n_{c,ls}$ is the carbon density of limestone, $V_{ls}$ is the volume fraction of limestone, $Y_c/Y_o$ is a measure of C/O ratio, $S_w$ is water saturation, $S_o$ is oil saturation where $S_o+S_w=1$, and $\rho_o$ is the density of oil.

10. The non-transitory computer-readable storage medium of claim 6, comprising comparing the continuous oil density log to a viscosity log associated with the well.

11. A system of determining continuous oil density of a hydrocarbon reservoir accessed by a well extending into the hydrocarbon reservoir, comprising:
   a processor;
   a non-transitory computer-readable memory accessible by the processor and having executable code stored thereon, the executable code comprising a set of instructions that causes a processor to perform operations comprising:
   conducting a pulsed neutron (PN) logging operation in the well to generate a carbon/oxygen (C/O) log for the well;
   conducting a water saturation logging operation to generate a water saturation log for the well, wherein the water saturation logging operation comprises the PN logging operation or a resistivity logging operation;
   conducting a porosity logging operation to generate a porosity log for the well;
   obtaining a carbon density value and an oxygen density value, the carbon density and oxygen density each associated with reservoir rock or pore fluids of the hydrocarbon reservoir; and
   determining, based on the C/O log, the water saturation log, the porosity log, and the carbon density value and the oxygen density value, a continuous oil density log for the well;

developing the hydrocarbon reservoir based on the continuous oil density log for the well, the developing comprising:
  determining, based on the continuous oil density log for the well, well operating parameters comprising an injection rate; and
  operating the well in accordance with the well operating parameters, the operating comprising injecting a fluid into the reservoir at the injection rate.

12. The system of claim 11, wherein the carbon density value comprises a carbon density of limestone and the oxygen density value comprises an oxygen density of limestone and an oxygen density of water.

13. The system of claim 11, wherein determining, based on the C/O log, the water saturation log, and the plurality of carbon density values and a plurality of oxygen density values, a continuous oil density log for the well comprises determining the continuous oil density log using the following:

$$\rho_o = \frac{2.16 \times \left(\frac{Y_c}{Y_0}(\phi S_w n_{o,w} + V_{ls} n_{o,ls}) - V_{ls} n_{c,ls}\right)}{10^{23} \phi S_o}$$

where $\phi$ is porosity, $n_{o,w}$ is the oxygen density of water, $n_{o,ls}$ is the oxygen density of limestone, $n_{c,ls}$ is the carbon density of limestone, $V_{ls}$ is the volume fraction of limestone, $Y_c/Y_o$ is a measure of C/O ratio, $S_w$ is water saturation, $S_o$ is oil saturation where $S_o+S_w=1$, and $\rho_o$ is the density of oil.

14. The system of claim 11, wherein determining, based on the C/O log, the water saturation log, and the plurality of carbon density values and a plurality of oxygen density values, a continuous oil density log for the well comprises determining the continuous oil density log using the following:

$$\rho_o = \frac{12+R}{6.023*10^{23}} \frac{\frac{Y_c}{Y_0}(\phi S_w n_{o,w} + V_{ls} n_{o,ls}) - V_{ls} n_{c,ls}}{\phi S_o}$$

where R, is the ratio of hydrogen (H) to carbon (C), $\phi$ is porosity, $n_{o,w}$ is the oxygen density of water, $n_{o,ls}$ is the oxygen density of limestone, $n_{c,ls}$ is the carbon density of limestone, $V_{ls}$ is the volume fraction of limestone, $Y_c/Y_o$ is a measure of C/O ratio, $S_w$ is water saturation, $S_o$ is oil saturation where $S_o+S_w=1$, and $\rho_o$ is the density of oil.

* * * * *